United States Patent
Bazzi

(10) Patent No.: US 10,846,562 B2
(45) Date of Patent: Nov. 24, 2020

(54) SYSTEMS AND METHODS FOR IMAGE MATCHING

(71) Applicant: Rida A. Bazzi, Tempe, AZ (US)

(72) Inventor: Rida A. Bazzi, Tempe, AZ (US)

(73) Assignee: Arizona Board of Regents on behalf of Arizona State University, Tempe, AZ (US)

( * ) Notice: Subject to any disclaimer, the term of this patent is extended or adjusted under 35 U.S.C. 154(b) by 66 days.

(21) Appl. No.: 16/247,085

(22) Filed: Jan. 14, 2019

(65) Prior Publication Data

US 2019/0220693 A1 Jul. 18, 2019

Related U.S. Application Data

(60) Provisional application No. 62/617,007, filed on Jan. 12, 2018.

(51) Int. Cl.
| | | |
|---|---|---|
| *G06K 9/50* | (2006.01) | |
| *G06K 9/62* | (2006.01) | |
| *G06K 9/46* | (2006.01) | |
| *G06K 9/68* | (2006.01) | |

(52) U.S. Cl.
CPC ............ *G06K 9/6211* (2013.01); *G06K 9/469* (2013.01); *G06K 9/4638* (2013.01); *G06K 9/4642* (2013.01); *G06K 9/6215* (2013.01); *G06K 9/6223* (2013.01); *G06K 9/6224* (2013.01); *G06K 9/6276* (2013.01); *G06K 9/6892* (2013.01)

(58) Field of Classification Search
None
See application file for complete search history.

(56) References Cited

U.S. PATENT DOCUMENTS

| | | | | |
|---|---|---|---|---|
| 5,896,468 A | * | 4/1999 | Kowalski | G06T 5/20 348/597 |
| 7,668,376 B2 | * | 2/2010 | Lin | G06K 9/48 382/190 |
| 8,488,883 B2 | * | 7/2013 | Gutelzon | G06T 7/11 382/176 |
| 8,705,870 B2 | * | 4/2014 | Wang | G06F 16/583 382/201 |
| 8,859,952 B2 | * | 10/2014 | Ito | G03G 9/0926 250/271 |
| 8,897,598 B1 | * | 11/2014 | Ziegler | G06K 9/228 382/284 |
| 9,990,561 B2 | * | 6/2018 | Booth | G06K 9/4676 |

(Continued)

FOREIGN PATENT DOCUMENTS

JP 2010040032 A * 2/2010 ........... G06K 9/4676

OTHER PUBLICATIONS

Image matching—graphs, Huzefa Neemuchwala, Elsevier, 0165-1684, 2004, pp. 277-296 (Year: 2004).*

(Continued)

*Primary Examiner* — Jayesh A Patel
(74) *Attorney, Agent, or Firm* — Polsinelli PC

(57) ABSTRACT

Various embodiments disclosed herein relate to systems and methods for image matching involving the segmentation of images into regions and then defining and computing features of these regions to further identify geometrical relationships between the regions.

8 Claims, 16 Drawing Sheets
(12 of 16 Drawing Sheet(s) Filed in Color)

Determining matching edges

(56) References Cited

U.S. PATENT DOCUMENTS

| | | | |
|---|---|---|---|
| 10,192,131 B2* | 1/2019 | Olechowski, III | G06K 9/6211 |
| 10,445,890 B2* | 10/2019 | Wang | G06T 7/11 |
| 2005/0238198 A1* | 10/2005 | Brown | G06K 9/6203 |
| | | | 382/103 |
| 2008/0199044 A1* | 8/2008 | Tsurumi | G06T 7/269 |
| | | | 382/103 |
| 2009/0028403 A1* | 1/2009 | Bar-Aviv | G06K 9/46 |
| | | | 382/128 |
| 2009/0092336 A1* | 4/2009 | Tsurumi | G06K 9/6282 |
| | | | 382/294 |
| 2009/0285489 A1* | 11/2009 | Kanoh | G06K 9/2054 |
| | | | 382/190 |
| 2010/0030578 A1* | 2/2010 | Siddique | G06Q 40/12 |
| | | | 705/3 |
| 2010/0088295 A1* | 4/2010 | Duan | G06F 16/5846 |
| | | | 707/705 |
| 2010/0310177 A1* | 12/2010 | Xiong | G06K 9/6211 |
| | | | 382/201 |
| 2010/0310182 A1* | 12/2010 | Kroepfl | G06K 9/00624 |
| | | | 382/216 |
| 2011/0115921 A1* | 5/2011 | Wang | G06T 7/90 |
| | | | 348/187 |
| 2011/0292219 A1* | 12/2011 | Chang | G06T 7/80 |
| | | | 348/182 |
| 2011/0312374 A1* | 12/2011 | Chen | H04N 1/00183 |
| | | | 455/556.1 |
| 2012/0088295 A1* | 4/2012 | Yasuda | C12M 47/04 |
| | | | 435/288.7 |
| 2012/0200559 A1* | 8/2012 | Ahn | G06T 15/00 |
| | | | 345/419 |
| 2013/0058582 A1* | 3/2013 | Van Beek | G06K 9/6857 |
| | | | 382/221 |
| 2013/0163874 A1* | 6/2013 | Shechtman | G06T 7/337 |
| | | | 382/190 |
| 2013/0251269 A1* | 9/2013 | Chehaiber | G06F 16/583 |
| | | | 382/197 |
| 2014/0133763 A1* | 5/2014 | van Zwol | G06K 9/6211 |
| | | | 382/218 |
| 2014/0247963 A1* | 9/2014 | Lin | G06K 9/6202 |
| | | | 382/103 |
| 2015/0213328 A1* | 7/2015 | Mase | G06K 9/4671 |
| | | | 382/201 |
| 2015/0220810 A1* | 8/2015 | Mase | G06K 9/46 |
| | | | 382/195 |
| 2015/0242686 A1* | 8/2015 | Lenka | G06K 9/6202 |
| | | | 382/103 |
| 2016/0012594 A1* | 1/2016 | Romanik | G06T 7/337 |
| | | | 382/203 |
| 2016/0155011 A1* | 6/2016 | Sulc | G06K 9/00671 |
| | | | 382/103 |
| 2016/0155025 A1* | 6/2016 | Arora | G06T 5/20 |
| | | | 382/165 |
| 2016/0171318 A1* | 6/2016 | Li | G06K 9/00832 |
| | | | 382/103 |
| 2018/0061052 A1* | 3/2018 | Bedi | G06T 7/73 |
| 2019/0139225 A1* | 5/2019 | Wang | G06K 9/4604 |

OTHER PUBLICATIONS

Image matching—technique, Haifeng Zhao et al., Elsevier, 0925-2312, 2014, pp. 611-618 (Year: 2014).*

Human face detection—relationship, Chiunhsiun Lin et al., IEEE, 0-7695-0750-6, 2000, pp. 941-944 (Year: 2000).*

U.S. Appl. No. 16/591,331, filed Oct. 2, 2019.

* cited by examiner

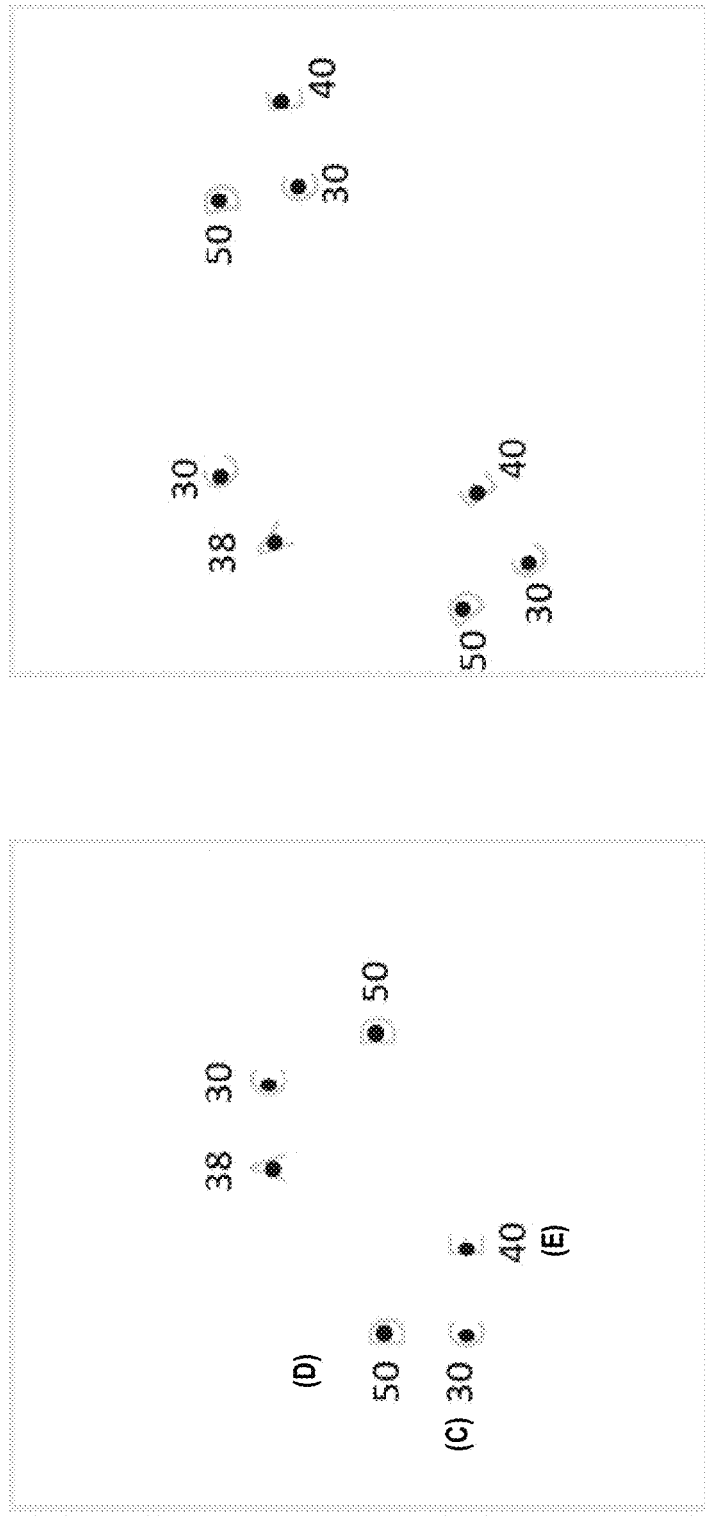

k-nearest neighbors example for one point

Determine k-nearest neighbors for each point

Making the Graph Symmetric

Determining matching edges adding v4 and v'4

After adding v4 and v'4, we get the following matching structures

Image B

Image A

SYSTEMS AND METHODS FOR IMAGE MATCHING

CROSS REFERENCE TO RELATED APPLICATIONS

This is a non-provisional application that claims benefit to U.S. provisional application Ser. No. 62/617,007, filed on Jan. 12, 2018, which is herein incorporated by reference in its entirety.

FIELD

The present disclosure generally relates to systems and methods for image matching; and, in particular, determining if one image or parts of one image are identical or similar to another image or parts of another image.

BACKGROUND

Image matching involves a process by which similarities between images or portions of an image are identified. Similarities between different images may range from the case where the images are exact copies of one another, to the case where images share the same or similar content. Matching algorithms have applications in document image retrieval, de-duplications (detecting multiple copies of the same image), detecting copyright violations (copyrighted image is copied and manipulated in some form), visual querying (looking up images that are similar to a given image), or image stitching (constructing a composite image in which two images that overlap to some extent are seamlessly stitched together). Image matching is typically achieved by calculating local features of the images and identifying points that have interesting local features. Once those points' features are identified, points in the two images with similar features can be corresponding points. Determining which points in one image correspond to points in the other image can be done using random sampling (RANSAC) under the assumption of a model of how parts of one image are mapped to parts of another image. In addition, features such as the Scale Invariant Feature Transform (SIFT), Oriented FAST and rotated BRIEF (ORB), speeded up robust features (SURF) or other features can be used to determine which points in one image correspond to points in the other image.

Document image retrieval is concerned with finding a document in a database or collection of documents that matches some given keywords or a view (partial or complete) of the document. This can be done with the help of Optical Character Recognition (OCR) or without OCR by extracting features of words or lines of text of the query image against features of words or lines of the document database. However, many existing works are dependent on local point features.

It is with these observations in mind, among others, that various aspects of the present disclosure were conceived and developed.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

FIGS. 4A-4B are illustrations of point descriptors derived from the regions of FIGS. 3A-3B that are processed according to the image matching functionality described herein.

Corresponding reference characters indicate corresponding elements among the view of the drawings. The headings used in the figures do not limit the scope of the claims.

DETAILED DESCRIPTION

The present disclosure relates to an inventive concept for image matching that may be implemented in the form of systems and methods including one or more computing devices or processing elements. In general, the advanced image matching functionality described herein includes the segmentation of an image into regions, and calculating features of these regions and how these regions relate to each other geometrically in order to compare portions of the image or compare the image with a separate image. The present disclosure may be suitable for matching images of text documents, but can also be applied to other types of images. In some embodiments, the object of the described image matching is to determine where portions of a single image are similar to one another based on geometric relationships defined using the functionality described herein, or whether portions associated with different images are similar to one another or at least share certain geometric features.

Figure 1:
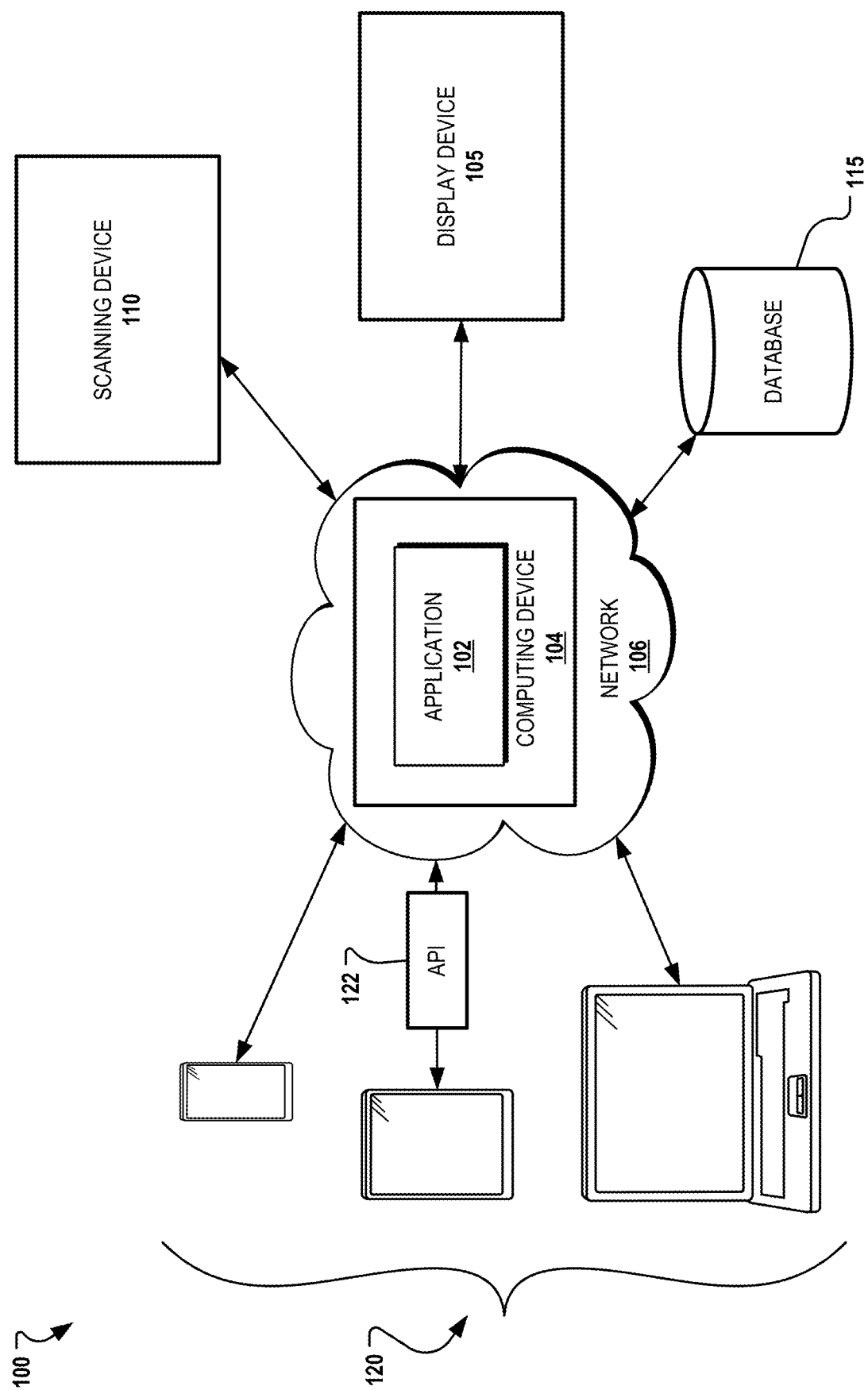
FIG. 1 is a simplified block diagram of a possible system for implementing the image matching functionality described herein.

Referring to FIG. 1, an exemplary computer-implemented system (hereinafter "system") 100 for implementing functionality associated with image matching is shown. The system 100 may include and/or generally support functionality defined by an application 102 that configures one or more processors or computing devices to execute the image matching functionality described herein. The application 102 may be hosted on one or more of a computing device 104, which may include a server, controller, a personal computer, a terminal, a workstation, a portable computer, a mobile device, a tablet, a mainframe, or other such computing device. Further, aspects of the application 102 associated with image processing/matching may be outputted to a display device 105 as described herein. In general, the application 102 may be programmed to execute the algorithm or functionality defined by FIG. 2 and its associated details set forth herein.

The computing device 104 may be configured for administering and providing functionality of the application 102 via a network 106, which may include the Internet, an intranet, a virtual private network (VPN), and the like. In some embodiments, a cloud (not shown) may be implemented to execute one or more components of the system 100. In addition, aspects of the system 100 and/or the application 102 may be implemented using platform as a service (PaaS), and/or software as a service (SaaS) using e.g., Amazon Web Services, or other distributed systems.

In some embodiments, the computing device 104 may be in operable communication (by wired connection or wirelessly connected) with at least one of a scanning device 110. The scanning device 110 may be a high-speed scanner, camera, or other such device configured to capture images for access by the computing device 104. The scanning device 110 may be configured with any number of hardware or software features to accommodate the production of digital images for analysis by the computing device 104. In some embodiments, the scanning device 110 may include any device equipped with a camera or other image capture technology and capable of generating image data or digital images.

In addition, the computing device 104 may store images, and/or data and/or metadata regarding the images and image processing derived from the application 102 in a database 115. In addition, the database 115 may store metadata associated with operations of the application 102, such a queries, and historical data. The database 115 may further store and retrieve image data requested by the application 102, and store information about users of the application 102.

Further, at least some features of the application 102 may be made available to a plurality of user devices 120 in communication with the computing device 104 of the system 100 via the network 106. The plurality of user devices 120 may include, without limitation, a controller, a personal computer, a terminal, a workstation, a portable computer, a mobile device, a tablet, a phone, a pager, and a multimedia console. The plurality of user devices 120 may be accessible to or associated with administrators, technicians, or other such users. In some embodiments, any one or more of the user devices 120 may utilize or access an application programming interface (API) 122 associated with the application 102 to access functionality related to the application 102 as desired.

Figure 2:
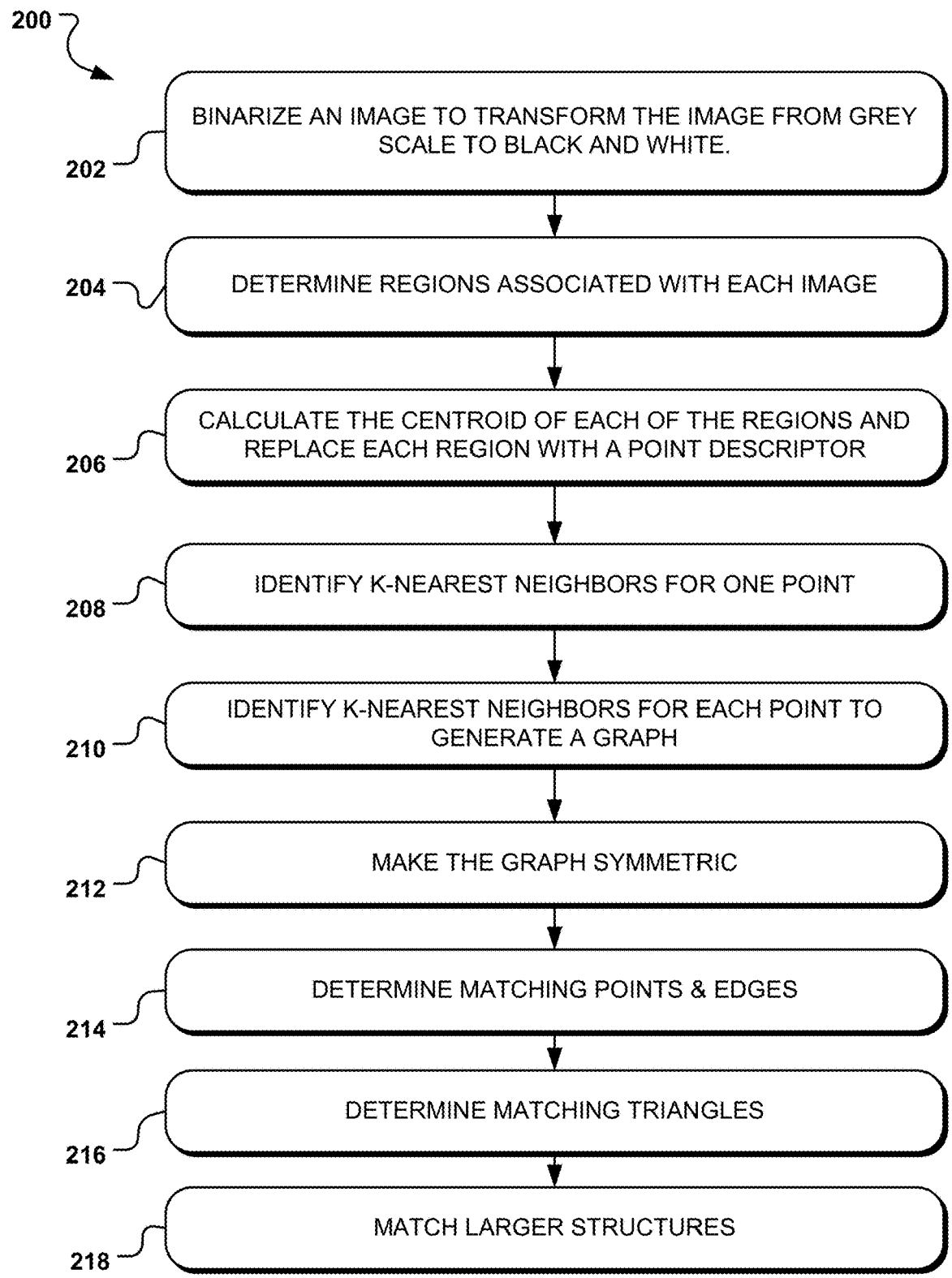
FIG. 2 is a simplified block diagram illustrating a process flow for matching images, according to aspects of the present disclosure.

Referring to FIG. 2, a process flow 200 is shown illustrating one possible method or algorithm for comparing and/or matching two images. It should be understood that the functionality described may involve first and second portions of a sole image, or first and second separate images, and the like. At block 202 of FIG. 2, an image (or multiple images) may be binarized to transform the image from color or grey scale to black and white. In some embodiments, this binarization step may be optional and the matching and features described herein may be calculated directly from the grey scale or color images without binarization.

At block 204, the image may be segmented into a plurality of regions. The image may be binarized or alternatively the image may be grey-scale or comprise a color image. In some embodiments, the segmentation is predetermined using connectedness as segmentation criterion to define the regions. More specifically, the image may be segmented into regions according to connected components associated with the image. As one non-limiting example, the connected components may define a plurality of pixels of the image that are either connected to one another, or are in close enough proximity to a predetermined degree. Connected components may define e.g. letters, or other areas of interest associated with a region. In some embodiments, regions of the image can be defined or segmented based on other considerations (such as color, image intensity, texture, or other features) and other criteria or multiple criteria can be used to segment the image into regions.

Figure 3B:
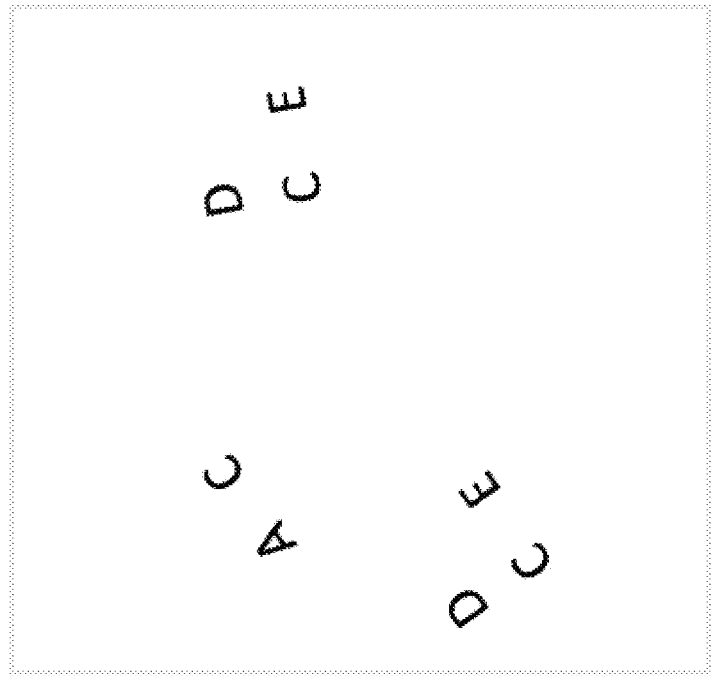
FIGS. 3A-3B are illustrations depicting images containing regions of connected components that are processed according to the image matching functionality described herein.
Figure 3A:
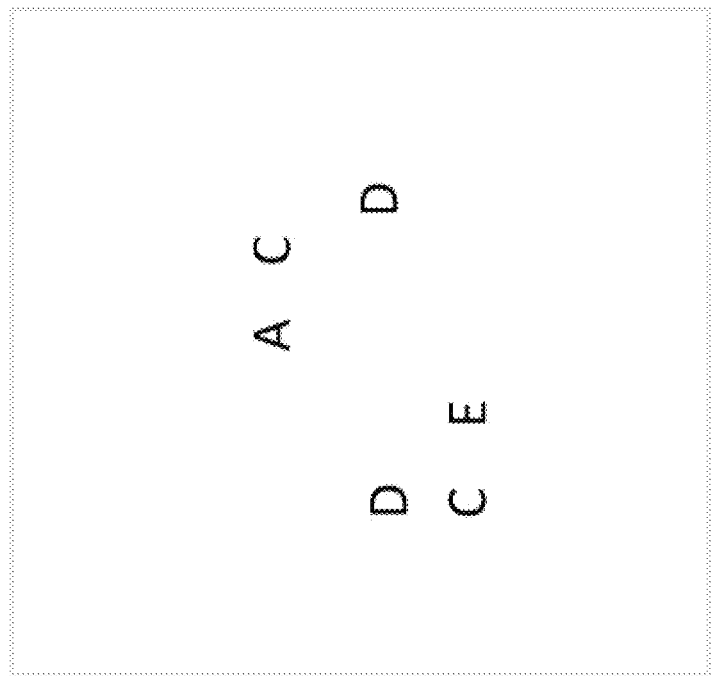

Referring to FIGS. 3A-3B, in one example illustrating block 204, two separate images ("image 1" and image 2" respectively, and collectively "images") may be segmented into a plurality of regions. In the example shown, each of image 1 and image 2 may be segmented into regions associated with letters of the alphabet. This example may involve the case where it is desired to e.g. compare documents to determine if there is overlapping or matching language. In this case, image 1 may be accessed from a first document, and image 2 may be accessed from a second document. It should however be understood that the novel concepts described herein may be applied to image matching and analysis within a sole document or image. That is, the regions of an image may be compared or otherwise analyzed as described herein to determine whether there are matching regions within a sole image or document.

In this example, regions are defined by connected components, such that every letter becomes a region because the pixels defining the letter form a connected region. It should be appreciated, however, that a region as described herein may be defined by other criteria, such as, but not limited to color and texture.

At block 206, with reference to FIGS. 4A-4B, point descriptors may be calculated or otherwise generated for the regions of the images described in block 204. In some embodiments, each region may be represented with a point descriptor consisting of: (1) a point (x and y coordinates) and (2) one or more features of the region. In some embodiments, each region is replaced by its center of gravity as the point (calculated by averaging the x and y coordinates of all points in the region) and the region's mass as the feature (the mass being equal to the number of points or pixels in the region). The point descriptor as described herein is not meant to limit the scope of the present disclosure. In general, a region can be replaced with multiple point descriptors. The features used for the point descriptors can be different and any features can be used, but it is desirable that the point and features as defined by the point descriptor be efficient to calculate and provide good discrimination between regions of the image. In some embodiments the mass feature can be used alone or in conjunction with other features. In other embodiments, the mass feature is not used at all and one or more other features are used instead.

In the example of FIGS. 4A-4B, the letters (regions) of image 1 and image 2 may be transformed to or replaced with the described point descriptors. For example, letters "C," "D," and "E," representing regions at the lower left side of image 1, may be transformed or translated to point descriptors that include the features 30, 50, and 40 respectively. In addition, as shown on page 3, points associated with "C," "D," and "E" may be calculated that may generally relate to the centermost portion of each region or letter, which may be plotted along the image shown. As indicated, the points may define centroids of the regions associated with the letters, and the features 30, 50, and 40 may define weights that distinguish the regions from one another. In some embodiments, each region associated with a letter may include a number of pixels, and the features for each point descriptor as generated for each region may be calculated by the average radius of each region and the sum of pixels within the region. Features defined by point descriptors may however be calculated in other ways and the present disclosure is not limited in this regard.

Figure 5A:
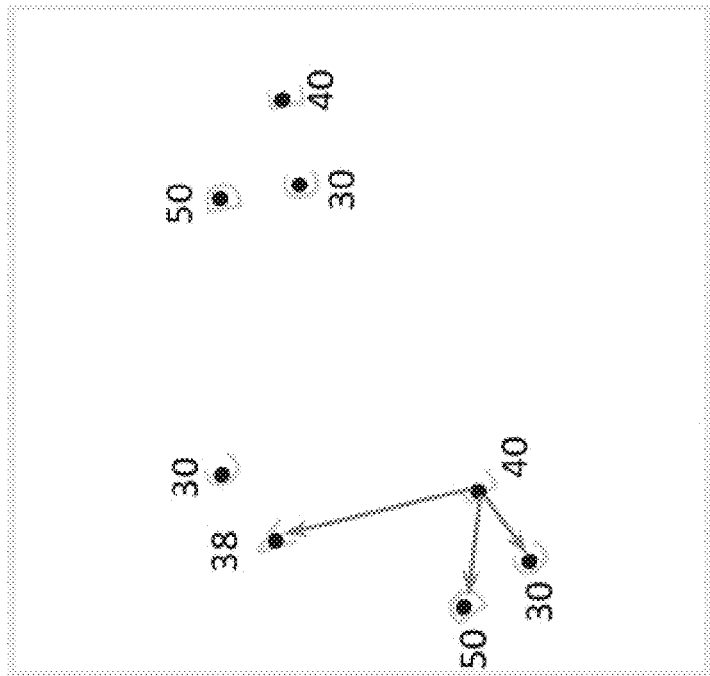
FIGS. 5A-5B are illustrations of point descriptors derived from the regions of FIGS. 3A-3B that are processed to define k-nearest neighbors according to the image matching functionality described herein.
Figure 5B:
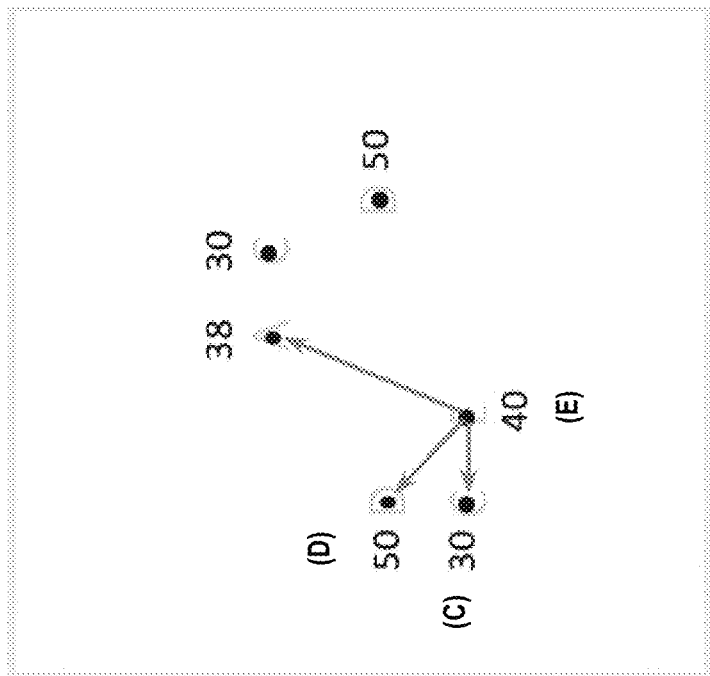

At block 208 with reference to FIGS. 5A-5B, the k-nearest neighbors for one point may be identified for image 1 and image 2. That is, in the illustration shown, the 3-nearest neighbors of the point corresponding to the region defined by the letter E in the lower part of the images may be identified. Each letter in the example defines a connected region and may be replaced by a point descriptor as described.

Figure 6A:
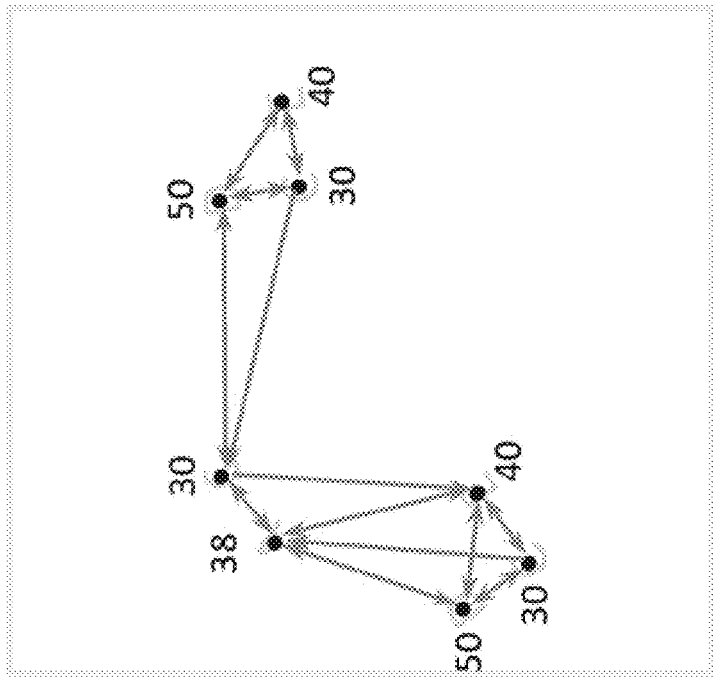
FIGS. 6A-6B are illustrations of the images showing the determination of a k-nearest neighbor for each point.
Figure 6B:
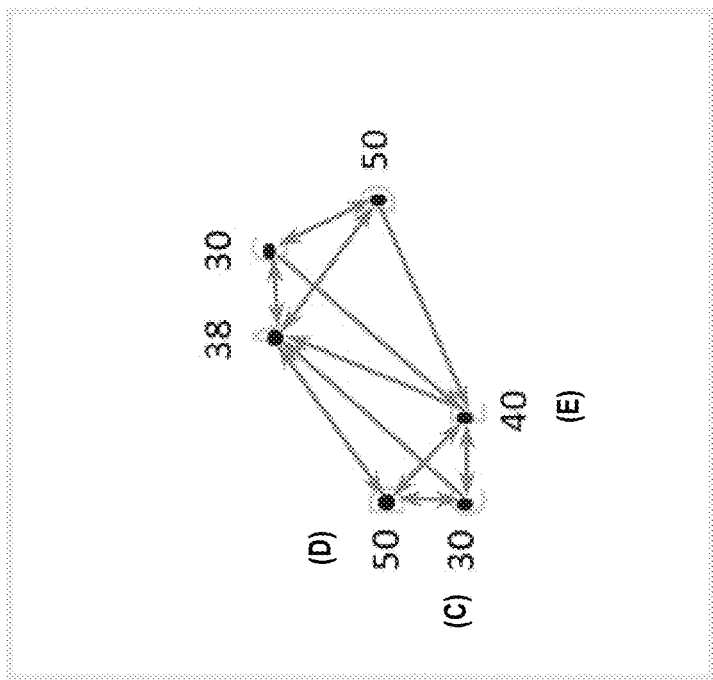

At block 210 with reference to FIGS. 6A-6B, for each point of a point descriptor of the image, the k-nearest neighbors of the point may be calculated or otherwise determined. In this step, a geometric construct or graph is ultimately generated whose vertices are the point descriptors associated with the regions previously identified. In this graph, an edge is defined from a vertex x to a vertex y if y is one of the k closet points to x.

More specifically, y is defined as one of the k-nearest neighbors of x if y is one of the k-closest points to x amongst all points. "k" is defined in the present example as being equal to 3, however, K may be a parameter that can be dynamically chosen based on the characteristics of the image or can be fixed. In some embodiments, values of k between 8 and 16 may be sufficient but the present disclosure is not limited in this regard.

As shown, edges or lines are drawn between the points of the point descriptors representing the regions associated with "C," "D," and "E" of FIGS. 3A-3B, and FIGS. 4A-4B. Specifically, a line is drawn between 30 and 50 (representing C and D respectively), a line is drawn between 50 and 40 (representing D and E respectively), and a line is drawn between 40 and 30 (representing E and C respectively). As such, a graph or geometric construct is formed or otherwise generated which includes the vertices of 30, 50, and 40, and is generally triangular in shape.

Figure 7B:
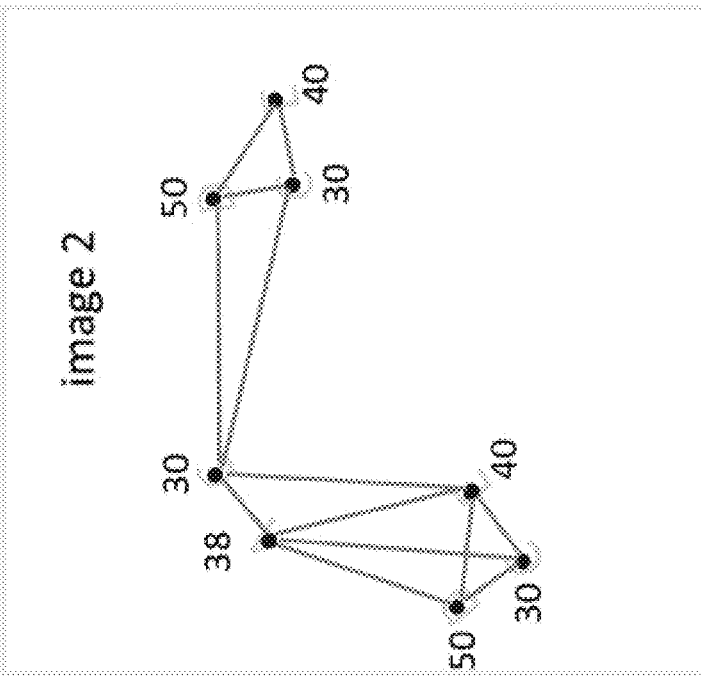
FIGS. 7A-7B are illustrations of the images showing a process of making the selected features symmetric.
Figure 7A:
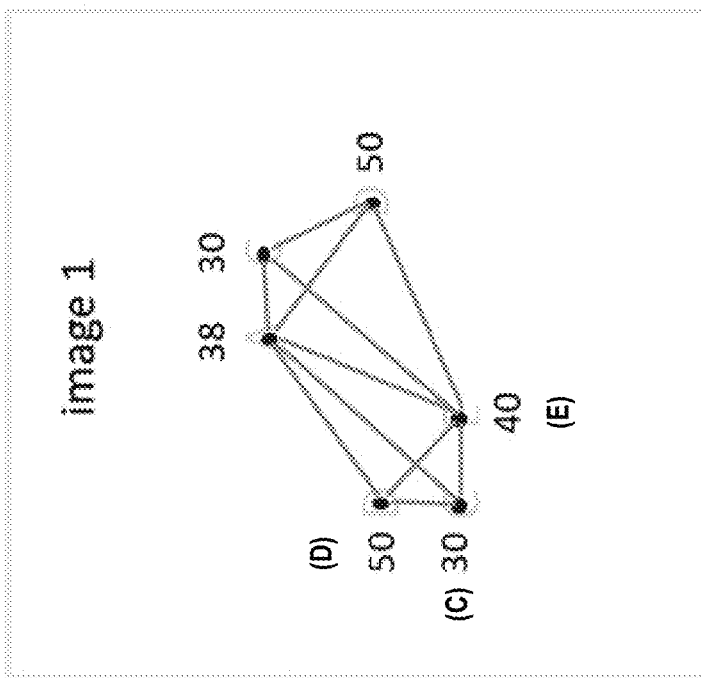

At block 212 with reference to FIGS. 7A-7B, the graph as defined above may be made symmetric, as the graph or geometric construct is not necessarily symmetric if x is a neighbor of y; y is not necessarily a neighbor of x. In the example shown, the point corresponding to E is one of the 3 nearest neighbors of the point corresponding to D, but the point corresponding to D is not one of the three nearest neighbors of the point corresponding to E. This is illustrated by a unidirectional arrow from the point corresponding to D to the point corresponding to E in FIGS. 6A-6B.

Accordingly, the graph can be extended to make it symmetric. If x is the neighbor of y and y is not already a neighbor of x, we can add y to the list of neighbors of x if we want to make the graph symmetric. At this stage, the aforementioned steps may be repeated for a second image, or the steps may have been conducted concurrently for both images.

Figures 8A, 8B:
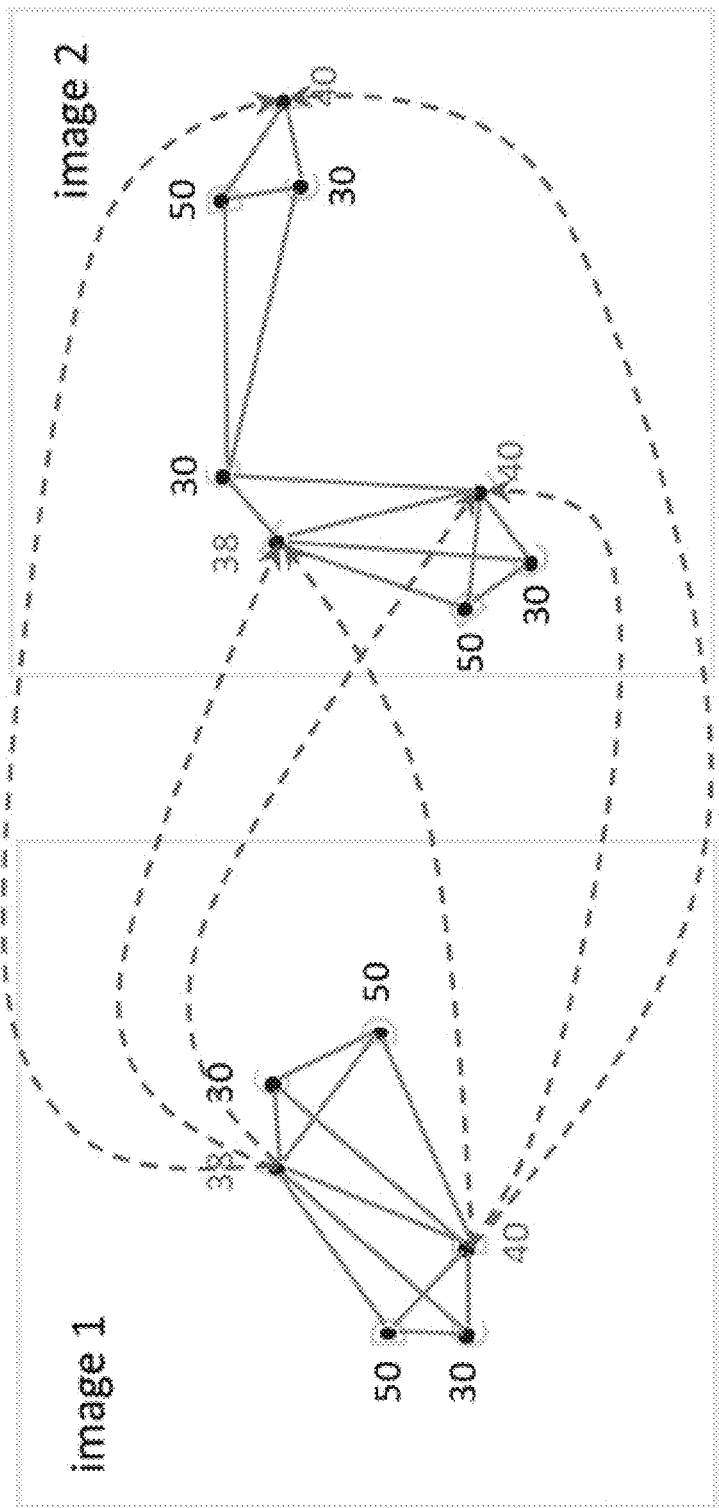
FIGS. 8A-8B are illustrations of the images showing the determination of matching points between the images.

At block 214, with reference to FIGS. 8A-8B, matching or comparison may be conducted between points of the first image (image 1) and the second image (image 2). More specifically, a point in a first image may be defined as matching a point in another image whose features are within a predefined threshold with respect to one another, as shown. In some embodiments, points may be deemed to be matching between images if such threshold is set at 10%. In the example shown, the points of image 2 are indicated that match with the points of 38 and 40 in image 1. In the example shown, not all matching points are illustrated for easier reading. Not that matching of points may be conducted independently of their position relative to other points.

Figures 9A, 9B:
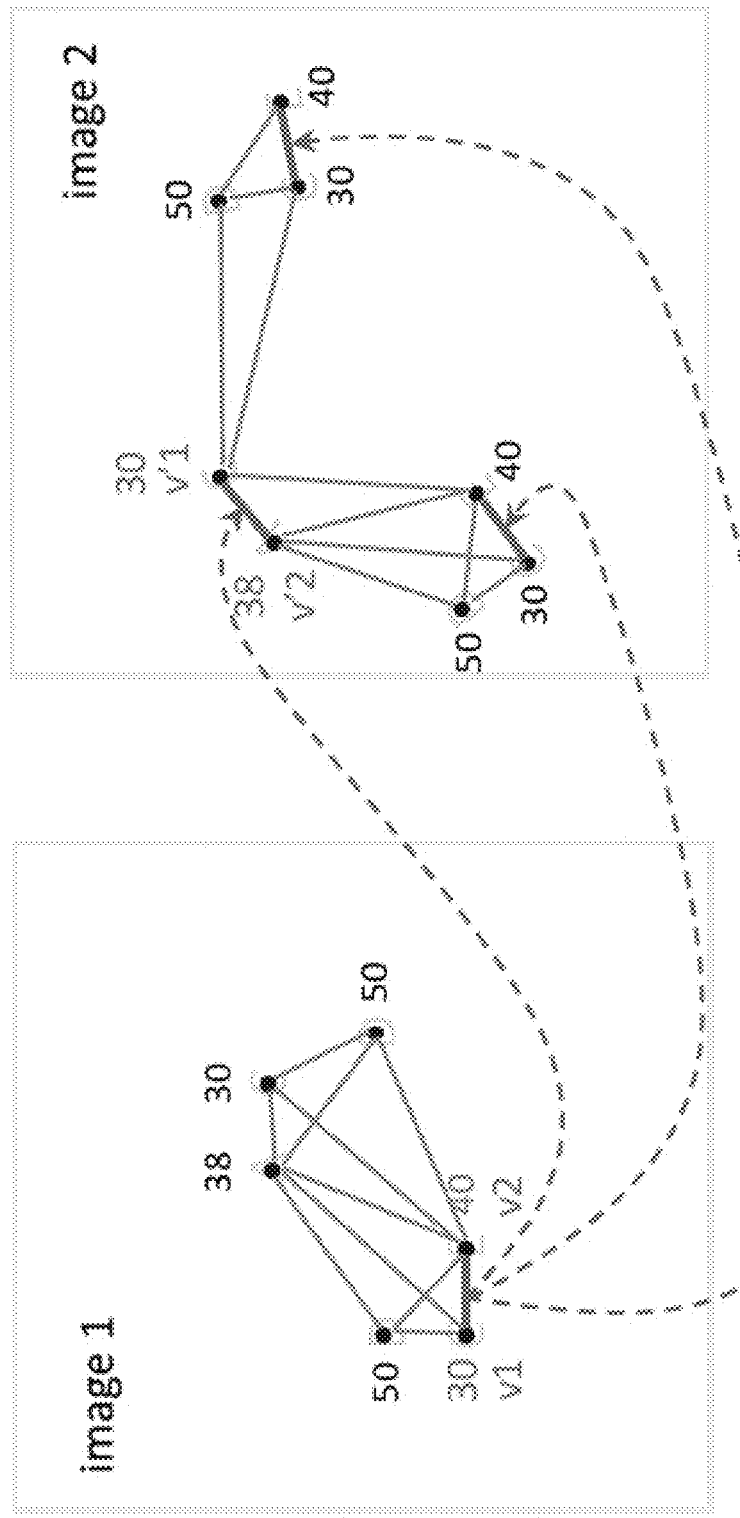
FIGS. 9A-9B are illustrations of the images showing the determination of matching edges.

Referencing FIGS. 9A-9B, edges may also be matched. In some embodiments, an edge may consist of two points and the edge between them. On edge with vertices v1 and v2 in one image matches with an edge with vertices v'1 and v'2 in the other image if v1 matches v2, v'1 matches v'2, and the distance between v1 and v2 is close to the distance between v'1 and v'2 to within a predetermined threshold.

In the example shown, the distance used is the Euclidean distance and the threshold is a predetermined threshold. In general, other distance metrics can be used and the threshold can be determined as a function of the image. As further shown, the edges in the second image (image 2) shown are defined by the lower points with features 30 and 40. Note that an edge need not match exactly in either of the features of the end points or the length of the edge. For example, the edge with features 38 and 30 in the second image (image 2) has on vertex v1 with feature 30 matching vertex v'1 with feature 30 and one vertex v2 with feature 40 matching vertex v'2 with feature 38.

Figures 10A, 10B:
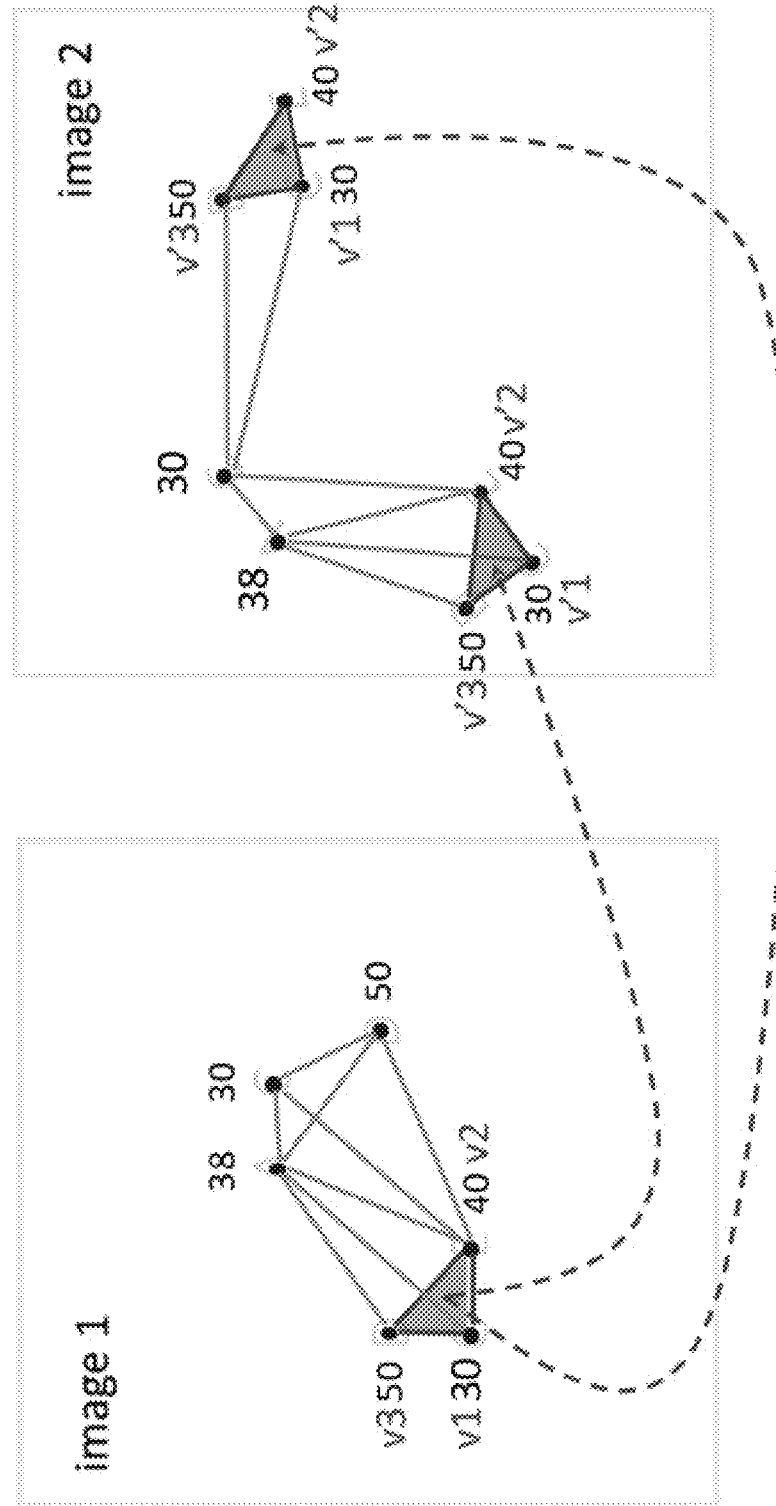
FIGS. 10A-10B are illustrations of the images showing the determination of matching triangles or triangle shapes.

At block 216, with reference to FIGS. 10A-10B, matching triangles between the first image (image 1) and the second image (image 2) may be identified. In the given example, triangles identified in the second image match the first image. A triangle is identified by its three vertices. A triangle with vertices v1, v2, and v3 matches a triangle with vertices v'1, v'2, and v'3 if the following holds:

1. The edge with vertices v1 and v2 matches the edge with vertices v'1 and v'2.
2. The edge with vertices v1 and v3 matches the edge with vertices v'1 and v'3.
3. The edge with vertices v2 and v3 matches the edge with vertices v'2 and v'3.

In this example, the distance used is the Euclidean distance and the threshold is a predetermined threshold. In general, other distance metrics may be used and the threshold can be determined as a function of the image.

As illustrated in FIGS. 11A-11B, FIGS. 12A-12B, FIGS. 13A-13B, FIGS. 14A-14B, and FIGS. 15A-15B, additional neighboring points may be connected to form a larger geometric construct depending upon the value of "k" chosen. The distances between all vertices need not be measure to match the larger structures or otherwise expand or grow the geometric construct shown.

Figures 11A, 11B:
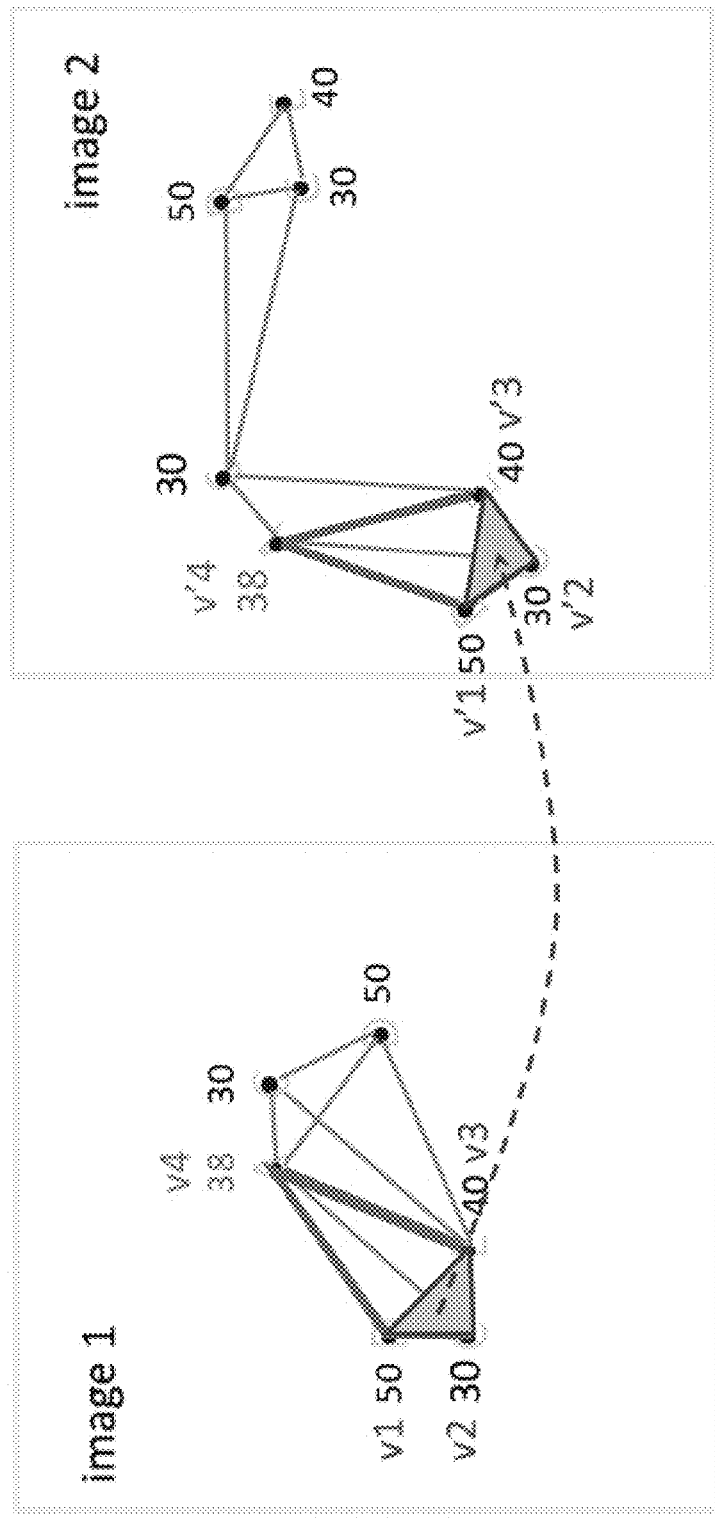
FIGS. 11A-11B are illustrations of the images showing the matching of large structures between the images.
Figures 12A, 12B:
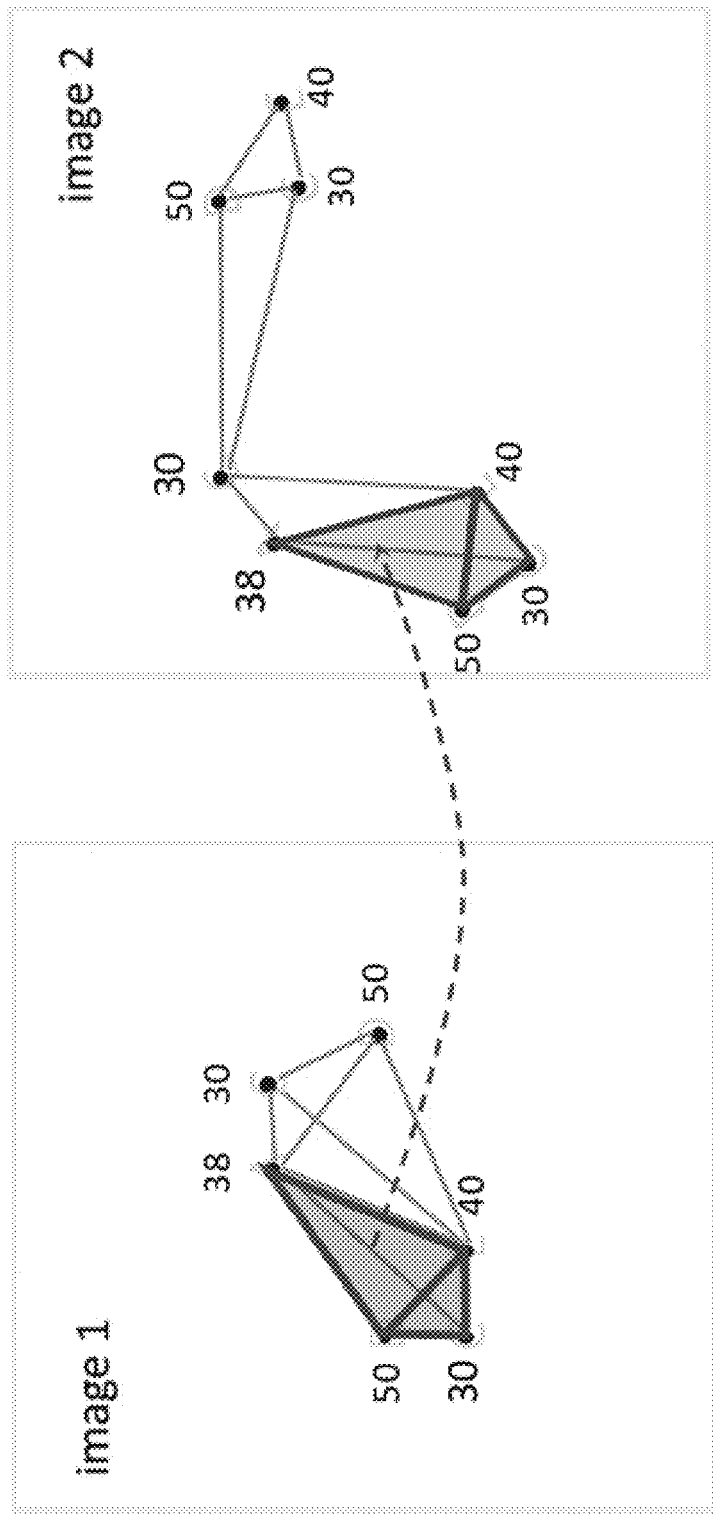
FIGS. 12A-12B are further illustrations of the images showing the matching of large structures between the images.

For example, referencing FIGS. 11A-11B, for image 1, the geometric construct that includes the point descriptors of 30, 50, and 40 may be expanded to include the point descriptor of 38 (v4) to form the polygon shown in FIGS. 12A-12B. In other words, the point represented by v4 and the point represented by v'4 may be added to the structures shown in image 1 and image 2, respectively. In this example, we assume that we have already determined that the triangle with vertices v1, v2, and v3 in image 1 matches with the triangle with vertices v'1, v'2, and v'3 (colored in red) and that we are considering to add the point v4 with feature 38 to image 1 and the point v'4 with feature 38 to the two matches triangles to obtain two large matching geometric structures. We determined that the triangle with vertices v1, v3, and v4 matches with the triangle with vertices v'1, v'3, and v'4. This by itself does not necessarily ensure that the structure with vertices v1, v2, v3, and v4 of image 1 matches the structure with vertices v'1, v'2, v'3, and v'4 of image 2. The two structures shown are considered to match where the two adjacent triangles in one image match the two adjacent triangles in the other image. Also, v2 and v4 are on two different side of the common line defined by the two vertices v1 and v3, the same as v'2 and v'4 are on different sides of the line defined by the two vertices v'1 and v'3.

Figures 13A, 13B:
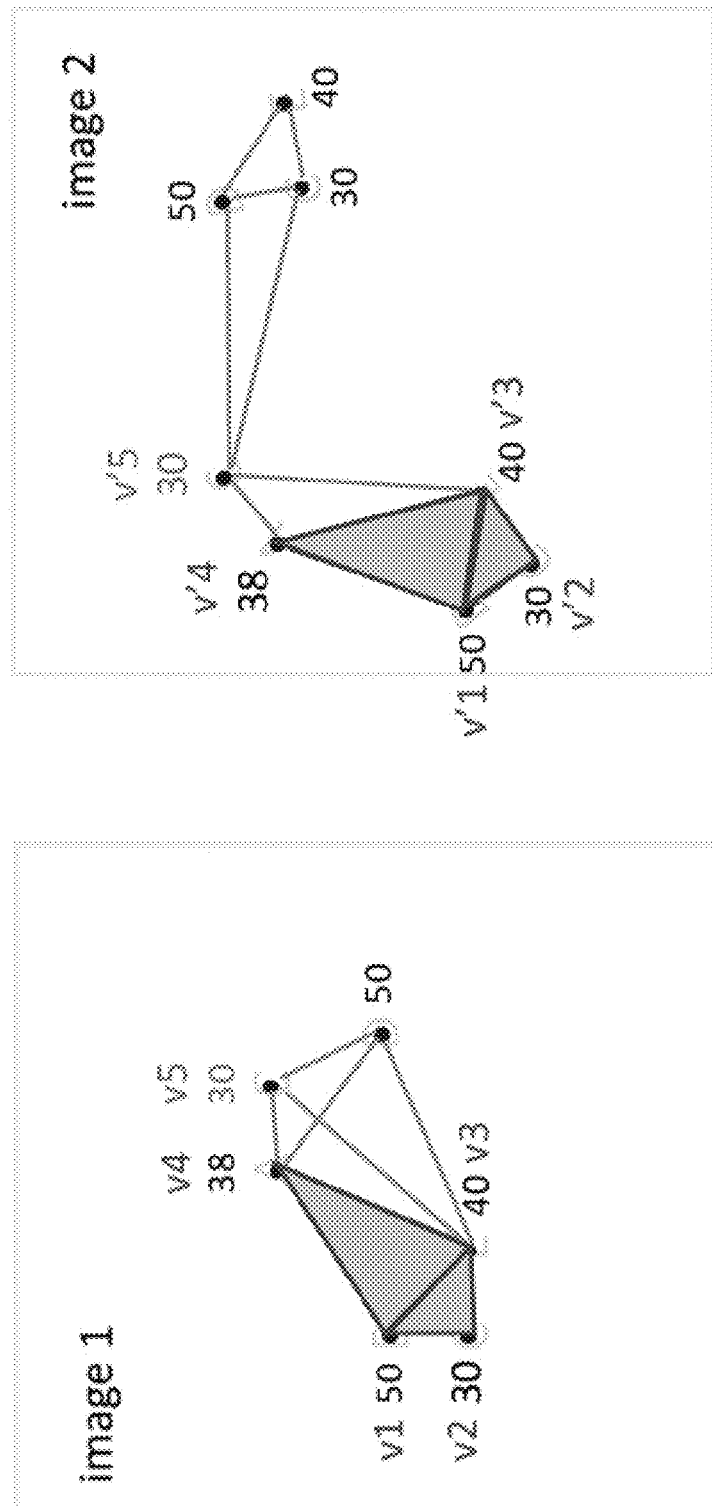
FIGS. 13A-13B are further illustrations of the images showing the matching of large structures between the images.

Referring to FIGS. 13A-13B, the point v5 with the feature 30 may be also added to further grow the geometric construct and otherwise form the polygon shown. In other words, the points v5 and v'5 may be added to the geometric constructs of image 1, and image 2, respectively. Increasing the size of the geometric constructs incrementally by adding further neighboring points of point descriptors may be ideal where it is desired to have more subject matter of an image to compare with another image and therefore increase the probability of an overall match.

Figure 14B:
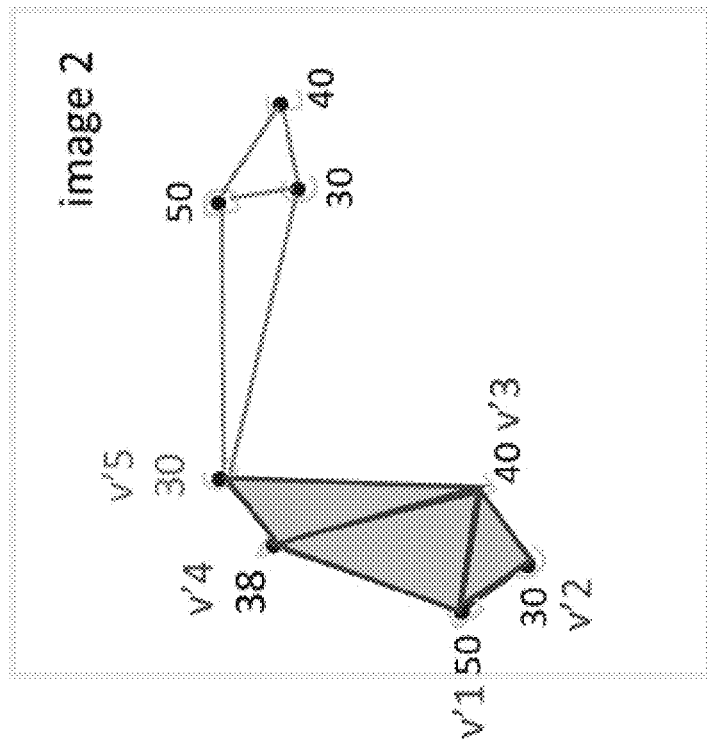
FIGS. 14A-14B are further illustrations of the images showing the matching of large structures between the images.
Figure 14A:
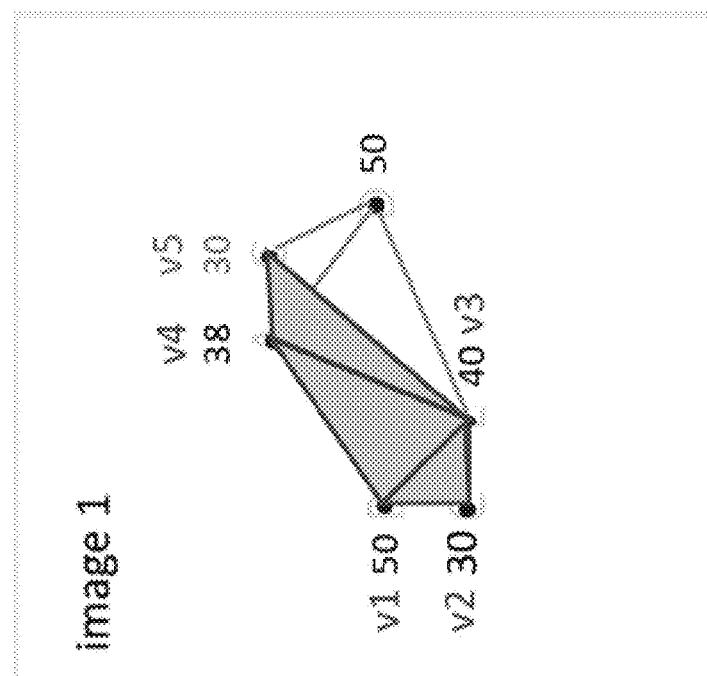

In this example, we find that the triangle with vertices v4, v3, and v5 of image 1 matches the triangle with vertices v'4, v'3, and v'5 of image 2. Also, v5 and v1 are on different sides of the line passing through v4 and v3. We can conclude that we add v5 and v'5 to grow the geometric constructs or otherwise obtain large matching structures as indicated in FIGS. 14A-14B. In some embodiments, the geometric constructs of image 1 and image 2 may be further grown by adding additional points as desired in order to attempt to identify further matching features.

Figure 15B:
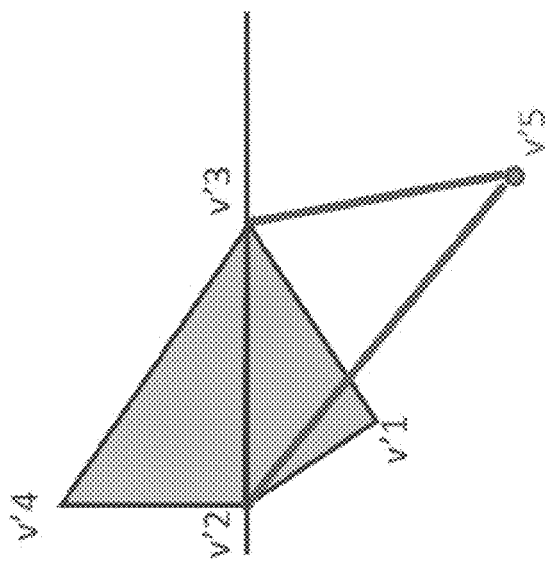
FIGS. 15A-15B are images illustrating how to determine whether points are on the same side relative to a line for use with matching larger structures.
Figure 15A:
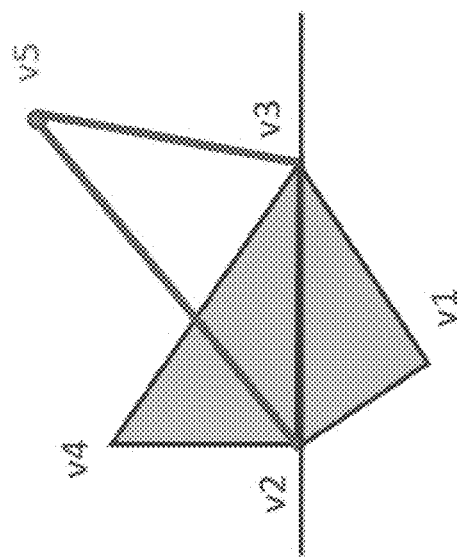
Figure 16:
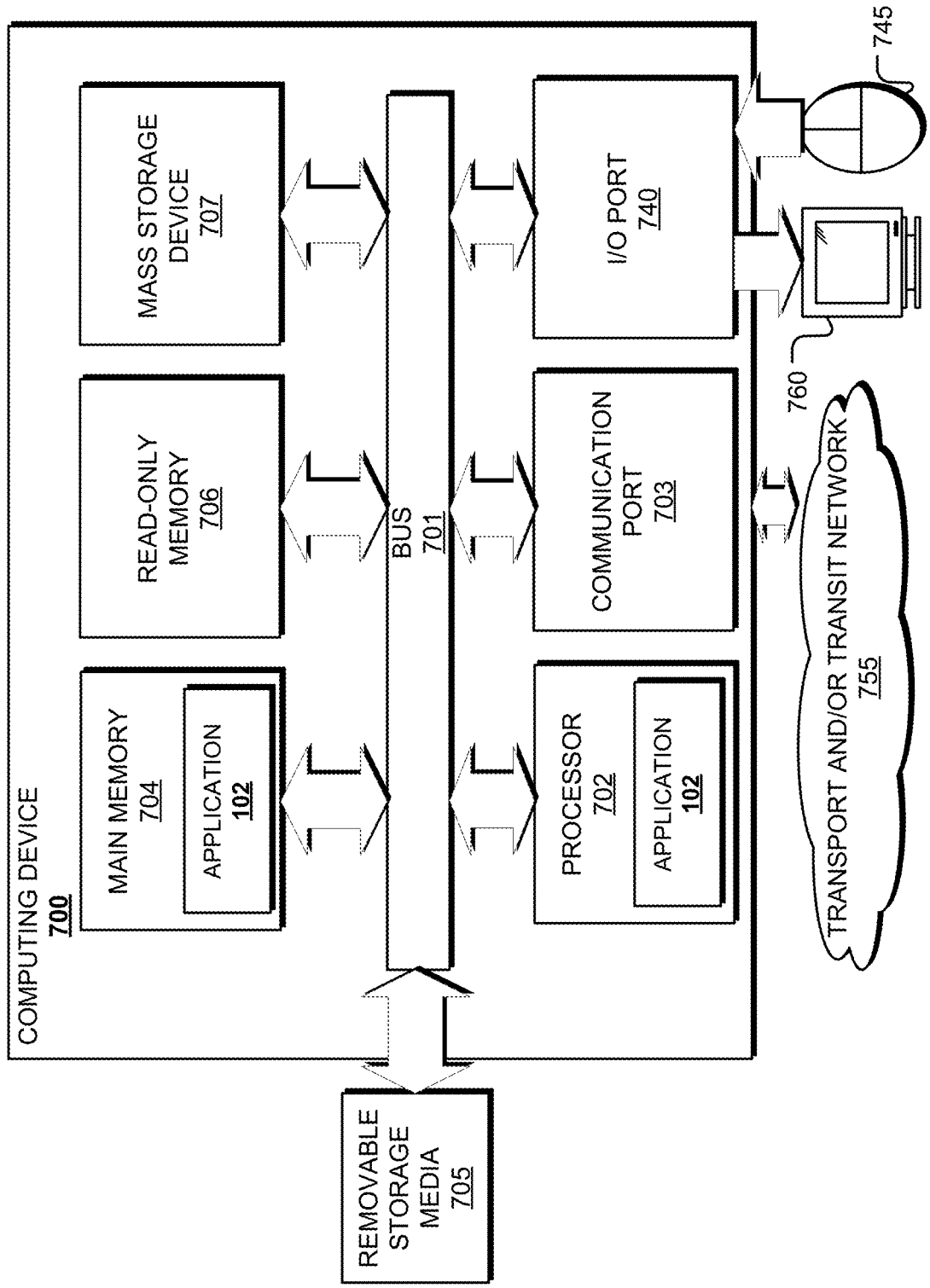
FIG. 16 is a simplified block diagram showing an example of a computing system that may implement various services, systems, and methods discussed herein.

Referencing FIGS. 15A-15B, an example is shown for determining if two points are on the same side relative to a line. An important step in matching larger structures is to determine if two points are on the same side or on different sides of a line. In the example shown, the structure of image A with vertices v1, v2, v3, and v4 matches the structure with vertices v'1, v'2, v'3, and v'4 of image 2. Also, the triangle with vertices v2, v3, and v5 of image A matches with the triangle with vertices v'2, v'3, and v'5 of image B.

However, in the example shown, we cannot form a large matching structure with 5 vertices because v1 and v5 are on different sides of the line passing through v2 and v3, whereas v'1 and v'5 are on the same side of the line passing through v'2 and v'3.

In general, if the line equation is $a^x+b^y+c=0$; and two points with coordinates (x1,y1) and (x2,y2) are given, then:

1. The two pints are in the same half-plane relative to the line if the following holds:

$(a^x{}_1+b^y{}_1+c)*(a^x{}_2+b^y{}_2+c)>0$

2. The points are in different half-planes relative to the line if the following holds:
   following holds:

$(a^x{}_1+b^y{}_1+c)*(a^x{}_2+b^y{}_2+c)<0$

Additional details related to the concept of matching large structures are provide as follows:

In general, a subset of vertices V in one geometric construct <u>matches</u> a subset V with an equal number of vertices in another geometric construct if there is a function f( ) from V to V' such that f( ) is a bijection (the function is one-to-one and onto) and the following holds:

I. if f(v)=v', then the features associated with v and v' are close to each other. The closeness of features can be defined in a number of ways. In some embodiments, the mass of the region that a vertex represents is used as the features and two features are close to each other if the percent difference between the two masses is below some threshold (5%-10% seems to work well in practice), but in general one can consider other metrics to define closeness of features. Also, in general, features need not be scalar values and can be multidimensional.

II. if $f(v_1)=v'_1$ and $f(v_2)=v'_2$, then the distance $d(v_1,v_2)$ is close in value to the distance $d(v'_1,v'_2)$, where d is a distance metric. Closeness is measured as a percent difference between the two distances but other closeness measures can also be used. In some embodiments, the Euclidian distance is used, but other distances, including non-Euclidian distances, can also be used.

The definition of matching of two sets of point descriptors does not require generating a component graph or geometric construct for each set of point descriptors. In practice, having the graph or geometric construct can make the implementation of the matching more efficient, but other non-graph based implementations can also be used.

For many metrics, including the Euclidian distance, it is not necessary to check the distances between every pair of matching points when calculating the matching. For the Euclidian metric, the condition on matching is equivalent to the following. One set of vertices V in one component graph matches another set of vertices V' in another component graph, if there is a mapping f( ) from V to V', and there is a triangulation of V and a triangulation of V', such that the following is satisfied:

I. f( ) is a bijection

II. if $v_1$, $v_2$, $v_3$ are three vertices that define a triangle in the triangulation of V, then $f(v_1)$, $f(v_2)$, and $f(v_3)$ are three vertices that define a triangle in the triangulation of V'

III. if $v_1$, $v_2$, $v_3$ are three vertices that define a triangle in the triangulation of V, then the two triangles defined by $(v_1, v_2, v_3)$ and $f(v_2), f(v_3))$ are close to congruent. In the current implementation, the closeness is defined as a percent difference in the length of corresponding edges, but in general other closeness measures can be used when comparing edges.

IV. If $(v_1, v_2, v_3)$ and $(v_2, v_3, v_4)$ are two adjacent triangles with common vertices $v_2$ and $v_3$ in the triangulation of V, then $(f(v_1), f(v_2), f(v_3))$ and $(f(v_2), f(v_3), f(v_4))$ are adjacent triangles in the triangulation of V such that $v_1$ and $v_4$ are on the same side of the line passing through $v_2$ and $v_3$ if and only if $f(v_1)$ and $f(v_4)$ are on the same side of the line passing through $f(v_2)$ and $f(v_3)$.

Note that a triangulation is defined as a set of non-overlapping triangles such that each triangle in the set shares one edge with another triangle in the set. The formulation of matching in terms of triangles allows us to calculate the matching efficiently. There are other ways, including ways not based on triangles, to calculate the matching and a number of optimizations that can be applied.

In some embodiments, one other possible embodiment of a method for image matching related to the process flow 200 may involve the following steps. First, given two sets of point descriptors as described, one for each image, the method may involve determining one subset of point descriptors in one image that matches another subset of point descriptors in the other image.

The method proceeds iteratively. It first involves determining matching subsets of size 1 (individual points), then matching subsets of size 2 (edges), then matching subsets of size three (triangles). Then, having determined two matching subsets S and S', one for each image, the method adds one point p to S and one point p' to S' such that S ∪{p} and S'∪{p'} are matching. This process continues until no more points can be added.

In other embodiments, the method starts by determining matched points associated with images. These are points for which the values of the features are close according to some closeness measure (see above). The method involves selecting a pair of matched points $v_1$ and $v'_1$ and checks if they have neighbors $v_2$ and $v'_2$, respectively, such that the edge $v_1$-$v_2$ matches the edge $v'_1$-$v'_2$ (see above).

Next the method involves searching for two points $v_3$ and $v'_3$ adjacent to edge $v_1$-$v_2$ and edge $v_1'$-$v'_2$, respectively, such that the triangles ($v_1$, $v_2$, $v_3$) and ($v'_1$, $v'_2$, $v'_3$) match (see above).

After two matched subsets of size 3 are determined (the vertices of the matched triangles as described herein) the method tries to add more points to the two matched subsets iteratively. If S and S' are the two matched subsets after k iterations, the method picks any three points ($v_1$, $v_2$, $v_3$) in S and their corresponding matching points ($v'_1$, $v'_2$, $v'_3$) in S'. Then, the method involves searching for two matched points p and p' such that the triangles (p, $v_2$, $v_3$) and (p', $v'_2$, $v'_3$) are matching (see above) and such that the two points p and $v_1$ are on the same side of the line passing through $v_2$ and $v_3$ if and only p' and $v'_1$ are on the same side of the line passing through $v'_2$ and $v'_3$.

The last step of the method may be repeated until there are no new matched points to add or if the set of matched points is sufficiently large (the definition of sufficiently large can be fixed or can be a function of the total number of point descriptors in the images.

Note that in general there can be multiple matched points p and p' that can be picked according to the requirements set forth above. The choice of the particular points p and p' that are picked in one iteration can have an effect on which other points can be matched in successive iterations. It is possible to do an exhaustive listing of all possible matchings by considering all possible choices of points p and p', then choose the largest matching. Note that the number of points that are potential matches to a given point can be reduced by using a more discriminating descriptor.

At the end of the process, a subset of points is generated in one image matching a subset of points in the other image. It should be understood that the set of points being worked with represent regions of the images. In the current implementation and without limiting the scope of the current invention claims these points are centroids of connected components or regions of the images and their corresponding descriptors.

When matching edges, the method can take the orientation of the edges into consideration if we expect that the images that match are not significantly rotated relative to each other.

FIG. 17 is an example schematic diagram of a computing device 700 that may implement various methodologies discussed herein. For example, the computing device 700 may comprise the computing device 104 executing or accessing functionality and/or aspects of the application 102, or otherwise configured to apply the image matching functionality described herein. The computing device 700 includes a bus 701 (i.e., interconnect), at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any of an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computer device 700 connects. Computing device may further include a transport and/or transit network 755, a display screen 760, an I/O port 740, and an input device 745 such as a mouse or keyboard.

Main memory 704 can be Random Access Memory (RAM) or any other dynamic storage device(s) commonly known in the art. Read-only memory 706 can be any static storage device(s) such as Programmable Read-Only Memory (PROM) chips for storing static information such as instructions for processor 702. Mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 701 communicatively couples processor(s) 702 with the other memory, storage, and communications blocks. Bus 701 can be a PCI/PCI-X, SCSI, or Universal Serial Bus (USB) based system bus (or other) depending on the storage devices used. Removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 704 may be encoded with the application 102 that supports functionality discussed above. In other words, aspects of the application 102 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 702 accesses main memory 704 via the use of bus 701 in order to launch, run, execute, interpret, or otherwise perform processes, such as through logic instructions, executing on the processor 702 and based on the application 102 stored in main memory or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Certain embodiments may be described herein as including one or more modules or services, such as the components of the application 102. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" or "module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Other possible embodiments include:

1. A system for matching images, comprising:
    at least one hardware processor that:
        determines a plurality of regions of a first image;
        transforms each of the plurality of regions into one or more points wherein said points form a first set of points;
        identifies geometric relationships between said points.
2. The system of claim 1, further comprising:
    determining a plurality of regions of a second image;
    transforming each of the plurality of regions into one or more points wherein said points form a second set of points;
    identifying geometric relationships between said points.
3. The system of claim 2, further comprising the step of finding a match between the said first set of points and the said second set of points.
4. The system of claim 1, wherein the step of identifying geometric relationships between said points comprises forming a graph.
5. The system of claim 2, wherein the step of identifying geometric relationships between said points comprises forming a graph.
6. The system of claim 4, wherein the step of forming a graph comprises one or more of having each said point be a vertex in the said graph, and having edges of said graph define a geometric relationship between said points.
7. The system of claim 5, wherein the step of forming a graph comprises one or more of having each said point be a vertex in the said graph, and having edges of said graph define a geometric relationship between said points.
8. The system of claim 6, wherein there is an edge from a first vertex to a second vertex if said point represented by said first vertex is a neighbor to said point represented by said second vertex.
9. The system of claim 7, wherein there is an edge from a first vertex to a second vertex if said point represented by said first vertex is a neighbor to said point represented by said second vertex.

10. The system of claim 8, wherein the step of forming a graph comprises calculating the k-nearest neighbors for each said point.

11. The system of claim 9, wherein the step of forming a graph comprises calculating the k-nearest neighbors for each said point.

12. The system of claim 1, wherein the step of identifying geometric relationships between said points comprises forming a triangulation.

13. The system of claim 2, wherein the step of identifying geometric relationships between said points comprises forming a triangulation.

14. The system of claim 1, further comprising the step of binarizing the first image 15. The system of claim 2, further comprising the step of binarizing the second image 16. The system of claim 1, wherein the step of determining a plurality of regions of said first image comprises determining connected components.

17. The system of claim 2, wherein the step of determining a plurality of regions of said second image comprises determining connected components.

18. The system of claim 1, further comprising the step of associating one or more features with each said point.

19. The system of claim 2, further comprising the step of associating one or more features with each said point.

20. The system of claim 1, further comprising the step of associating one or more point descriptors with each said point.

21. The system of claim 2, further comprising the step of associating one or more point descriptors with each said point.

22. The system of claim 6, wherein each said vertex is labeled with a point descriptor.

23. The system of claim 7, wherein each said vertex is labeled with a point descriptor.

24. The system of claim 1, wherein said point is a centroid of a region.

25. The system of claim 2, wherein said point is a centroid of a region.

26. The system of claim 18, wherein said feature is a mass.

27. The system of claim 19, wherein said feature is a mass.

28. The system of claim 20, wherein said point descriptor comprises the location of point in said image and one or more features.

29. The system of claim 21, wherein said point descriptor comprises the location of said point in said image and one or more features.

30. The system of claim 3, wherein the step of finding a match comprises matching vertices of two graphs.

31. The system of claim 3, wherein the step of finding a match comprises matching two or more triangles.

32. The system of claim 3, wherein the step of finding a match comprises matching point descriptors.

33. The system of claim 3, wherein the step of finding a match comprises matching vertices of two graphs.

34. The system of claim 3, wherein the step of finding a match comprises forming a first structure for said first image and a second structure for said second image.

35. The system of claim 34, wherein the said first structure and said second structure are each a mesh structure.

36. The system of claim 34, wherein the said first structure and said second structure are formed incrementally by adding to said first structure one or more points from said first set of points and adding to said second structure their matching one or more points from said second set of points.

37. A method for matching images, comprising:
    determining a plurality of regions of a second image;
    transforming each of the plurality of regions into one or more points wherein said points form a second set of points;
    identifying geometric relationships between said points.

38. The method of claim 37, further comprising:
    determining a plurality of regions of a second image;
    transforming each of the plurality of regions into one or more points wherein said points form a second set of points;
    identifying geometric relationships between said points.

39. The method of claim 38, further comprising the step of finding a match between the said first set of points and the said second set of points.

40. The method of claim 37, wherein the step of identifying geometric relationships between said points comprises forming a graph.

41. The method of claim 38, wherein the step of identifying geometric relationships between said points comprises forming a graph.

42. The method of claim 40, wherein the step of forming a graph comprises one or more of having each said point be a vertex in the said graph, and having edges of said graph define a geometric relationship between said points.

43. The method of claim 41, wherein the step of forming a graph comprises one or more of having each said point be a vertex in the said graph, and having edges of said graph define a geometric relationship between said points.

44. The method of claim 42, wherein there is an edge from a first vertex to a second vertex if said point represented by said first vertex is a neighbor to said point represented by said second vertex.

45. The method of claim 43, wherein there is an edge from a first vertex to a second vertex if said point represented by said first vertex is a neighbor to said point represented by said second vertex.

46. The method of claim 44, wherein the step of forming a graph comprises calculating the k-nearest neighbors for each said point.

47. The method of claim 45, wherein the step of forming a graph comprises calculating the k-nearest neighbors for each said point.

48. The method of claim 37, wherein the step of identifying geometric relationships between said points comprises forming a triangulation.

49. The method of claim 38, wherein the step of identifying geometric relationships between said points comprises forming a triangulation.

50. The method of claim 37, further comprising the step of binarizing the first image 51. The method of claim 38, further comprising the step of binarizing the second image 52. The method of claim 37, wherein the step of determining a plurality of regions of said first image comprises determining connected components.

53. The method of claim 38, wherein the step of determining a plurality of regions of said second image comprises determining connected components.

54. The method of claim 37, further comprising the step of associating one or more features with each said point.

55. The method of claim 38, further comprising the step of associating one or more features with each said point.

56. The method of claim 37, further comprising the step of associating one or more point descriptors with each said point.

57. The method of claim 38, further comprising the step of associating one or more point descriptors with each said point.

58. The method of claim 42, wherein each said vertex is labeled with a point descriptor.

59. The method of claim 43, wherein each said vertex is labeled with a point descriptor.

60. The method of claim 37, wherein said point is a centroid of a region.

61. The method of claim 38, wherein said point is a centroid of a region.

62. The method of claim 54, wherein said feature is a mass.

63. The method of claim 55, wherein said feature is a mass.

64. The method of claim 56, wherein said point descriptor comprises the location of point in said image and one or more features.

65. The method of claim 57, wherein said point descriptor comprises the location of said point in said image and one or more features.

66. The method of claim 39, wherein the step of finding a match comprises matching vertices of two graphs.

67. The method of claim 39, wherein the step of finding a match comprises matching two or more triangles.

68. The method of claim 39, wherein the step of finding a match comprises matching point descriptors.

69. The method of claim 39, wherein the step of finding a match comprises matching vertices of two graphs.

70. The method of claim 39, wherein the step of finding a match comprises forming a first structure for said first image and a second structure for said second image.

71. The method of claim 70, wherein the said first structure and said second structure are each a mesh structure.

72. The method of claim 70, wherein the said first structure and said second structure are incrementally formed by adding one or more points from said first set of points to said first structure and adding corresponding matching point(s) from said second set of points to said second structure.

73. A non-transitory computer-readable medium containing computer-executable instructions that, when executed by a hardware processor, cause the processor to perform a method for matching images, comprising:
determining a plurality of regions of a second image;
transforming each of the plurality of regions into one or more points wherein said points form a second set of points;
identifying geometric relationships between said points.

74. The non-transitory computer-readable medium of claim 73, further comprising:
determining a plurality of regions of a second image;
transforming each of the plurality of regions into one or more points wherein said points form a second set of points;
identifying geometric relationships between said points.

75. The non-transitory computer-readable medium of claim 74, further comprising the step of finding a match between the said first set of points and the said second set of points.

76. The non-transitory computer-readable medium of claim 73, wherein the step of identifying geometric relationships between said points comprises forming a graph.

77. The non-transitory computer-readable medium of claim 74, wherein the step of identifying geometric relationships between said points comprises forming a graph.

78. The non-transitory computer-readable medium of claim 76, wherein the step of forming a graph comprises one or more of having each said point be a vertex in the said graph, and having edges of said graph define a geometric relationship between said points.

79. The non-transitory computer-readable medium of claim 77, wherein the step of forming a graph comprises one or more of having each said point be a vertex in the said graph, and having edges of said graph define a geometric relationship between said points.

80. The non-transitory computer-readable medium of claim 78, wherein there is an edge from a first vertex to a second vertex if said point represented by said first vertex is a neighbor to said point represented by said second vertex.

81. The non-transitory computer-readable medium of claim 79, wherein there is an edge from a first vertex to a second vertex if said point represented by said first vertex is a neighbor to said point represented by said second vertex.

82. The non-transitory computer-readable medium of claim 80, wherein the step of forming a graph comprises calculating the k-nearest neighbors for each said point.

83. The non-transitory computer-readable medium of claim 81, wherein the step of forming a graph comprises calculating the k-nearest neighbors for each said point.

84. The non-transitory computer-readable medium of claim 73, wherein the step of identifying geometric relationships between said points comprises forming a triangulation.

85. The non-transitory computer-readable medium of claim 74, wherein the step of identifying geometric relationships between said points comprises forming a triangulation.

86. The non-transitory computer-readable medium of claim 73, further comprising the step of binarizing the first image.

87. The non-transitory computer-readable medium of claim 74, further comprising the step of binarizing the second image.

88. The non-transitory computer-readable medium of claim 73, wherein the step of determining a plurality of regions of said first image comprises determining connected components.

89. The non-transitory computer-readable medium of claim 74, wherein the step of determining a plurality of regions of said second image comprises determining connected components.

90. The non-transitory computer-readable medium of claim 73, further comprising the step of associating one or more features with each said point.

91. The non-transitory computer-readable medium of claim 74, further comprising the step of associating one or more features with each said point.

92. The non-transitory computer-readable medium of claim 73, further comprising the step of associating one or more point descriptors with each said point.

93. The non-transitory computer-readable medium of claim 74, further comprising the step of associating one or more point descriptors with each said point.

94. The non-transitory computer-readable medium of claim 78, wherein each said vertex is labeled with a point descriptor.

95. The non-transitory computer-readable medium of claim 79, wherein each said vertex is labeled with a point descriptor.

96. The non-transitory computer-readable medium of claim 73, wherein said point is a centroid of a region.

97. The non-transitory computer-readable medium of claim 74, wherein said point is a centroid of a region.

98. The non-transitory computer-readable medium of claim 90, wherein said feature is a mass.

99. The non-transitory computer-readable medium of claim 91, wherein said feature is a mass.
100. The non-transitory computer-readable medium of claim 92, wherein said point descriptor comprises the location of point in said image and one or more features.
101. The non-transitory computer-readable medium of claim 93, wherein said point descriptor comprises the location of said point in said image and one or more features.
102. The non-transitory computer-readable medium of claim 75, wherein the step of finding a match comprises matching vertices of two graphs.
103. The non-transitory computer-readable medium of claim 75, wherein the step of finding a match comprises matching two or more triangles.
104. The non-transitory computer-readable medium of claim 75, wherein the step of finding a match comprises matching point descriptors.
105. The non-transitory computer-readable medium of claim 75, wherein the step of finding a match comprises matching vertices of two graphs.
106. The non-transitory computer-readable medium of claim 75, wherein the step of finding a match comprises forming a first structure for said first image and a second structure for said second image.
107. The non-transitory computer-readable medium of claim 106, wherein the said first structure and said second structure are each a mesh structure.
108. The non-transitory computer-readable medium of claim 106, wherein the said first structure and said second structure are incrementally formed by adding one or more points from said first set of points to said first structure and adding corresponding matching point(s) from said second set of points to said second structure.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for image analysis, comprising:
utilizing a processor in communication with a tangible storage medium storing instructions that are executed by the processor to perform operations comprising:
accessing a first image;
generating a first geometric construct from the first image, by:
(a) identifying a plurality of regions associated with the first image and predetermined to be of interest,
(b) transforming the plurality of regions into a plurality of respective point descriptors, each of the plurality of respective point descriptors defining a point associated with a respective region and defined along the first image and a feature associated with the respective region,
(c) calculating a predefined k-number of nearest neighbor point descriptors associated with a first point descriptor of the plurality of respective point descriptors to define a set of point descriptors that collectively includes the first point descriptor and the k-number of nearest neighbor point descriptors,
(d) generating lines between points defined by the set of point descriptors, the lines defining edges of the first geometric construct and the points defining vertices of the first geometric construct;
generating a second geometric construct by repeating steps (a)-(d) for a second image; and
comparing the first geometric construct with the second geometric construct,
wherein the first geometric construct uniquely identifies a portion of the first image,
wherein each point associated with the plurality of respective point descriptors is a centroid defining an X and Y coordinate along the first image, and
wherein the feature includes a numerical value that takes into account an average radius of a given region of the plurality of regions associated with the first image, and a sum of pixels associated with the given region.

2. The method of claim 1, further comprising identifying a first region associated with the first image, by: analyzing a plurality of pixels associated with the first image; and selecting a desired set of the plurality of pixels associated with the first image to define the first region.

3. The method of claim 2, wherein the desired set of the plurality of pixels associated with the first image are selected based on color, image intensity, or texture.

4. The method of claim 2, wherein the desired set of the plurality of pixels associated with the first image defines a predetermined amount of connected components such that a predetermined number of pixels of the desired set of the plurality of pixels are connected to one another.

5. A method for image analysis, comprising:
utilizing a processor in communication with a tangible storage medium storing instructions that are executed by the processor to perform operations comprising:
accessing a first image;
generating a first geometric construct from the first image, by:
(a) identifying a plurality of regions associated with the first image and predetermined to be of interest,
(b) transforming the plurality of regions into a plurality of respective point descriptors, each of the plurality of respective point descriptors defining a point associated with a respective region and defined along the first image and a feature associated with the respective region,
(c) calculating a predefined k-number of nearest neighbor point descriptors associated with a first point descriptor of the plurality of respective point descriptors to define a set of point descriptors that collectively includes the first point descriptor and the k-number of nearest neighbor point descriptors,
(d) generating lines between points defined by the set of point descriptors, the lines defining edges of the first geometric construct and the points defining vertices of the first geometric construct, growing the first geometric construct, by:

identifying an additional point descriptor from the plurality of respective point descriptors defining an additional point that is in close proximity to at least one of the points defined by the first point descriptor and the k-number of nearest neighbor point descriptors, and generating additional edges that connect the additional point to the at least one of the points defined by the first point descriptor and the k-number of nearest neighbor point descriptors to define a modified first geometric construct that is larger than the first geometric construct;

generating a second geometric construct by repeating steps (a)-(d) for a second image; and comparing the first geometric construct with the second geometric construct, wherein the first geometric construct uniquely identifies a portion of the first image.

6. A method for image analysis, comprising:

utilizing a processor in communication with a tangible storage medium storing instructions that are executed by the processor to perform operations comprising:

accessing a first image;

generating a first geometric construct from the first image, by:

(a) identifying a plurality of regions associated with the first image and predetermined to be of interest, (b) transforming the plurality of regions into a plurality of respective point descriptors, each of the plurality of respective point descriptors defining a point associated with a respective region and defined along the first image and a feature associated with the respective region, (c) calculating a predefined k-number of nearest neighbor point descriptors associated with a first point descriptor of the plurality of respective point descriptors to define a set of point descriptors that collectively includes the first point descriptor and the k-number of nearest neighbor point descriptors, (d) generating lines between points defined by the set of point descriptors, the lines defining edges of the first geometric construct and the points defining vertices of the first geometric construct;

generating a second geometric construct by repeating steps (a)-(d) for a second image;

growing the first geometric construct, by:

identifying an additional point descriptor from the plurality of respective point descriptors defining an additional point that is in close proximity to at least one of the points defined by the first point descriptor and the k-number of nearest neighbor point descriptors, and generating additional edges that connect the additional point to the at least one of the points defined by the first point descriptor and the k-number of nearest neighbor point descriptors to define a modified first geometric construct that is larger than the first geometric construct;

growing the second geometric construct, by:

identifying a further point associated with a further point descriptor;

generating additional edges that connect the further point to the at least one of the points defining the second geometric construct to define a modified second geometric construct; and comparing the modified first geometric construct with the modified second geometric construct, wherein the first geometric construct uniquely identifies a portion of the first image.

7. A method for image analysis, comprising:

utilizing a processor in communication with a tangible storage medium storing instructions that are executed by the processor to perform operations comprising:

accessing a first image;

generating a first geometric construct from the first image, by:

(a) identifying a plurality of regions associated with the first image and predetermined to be of interest, (b) transforming the plurality of regions into a plurality of respective point descriptors, each of the plurality of respective point descriptors defining a point associated with a respective region and defined along the first image and a feature associated with the respective region, (c) calculating a predefined k-number of nearest neighbor point descriptors associated with a first point descriptor of the plurality of respective point descriptors to define a set of point descriptors that collectively includes the first point descriptor and the k-number of nearest neighbor point descriptors, (d) generating lines between points defined by the set of point descriptors, the lines defining edges of the first geometric construct and the points defining vertices of the first geometric construct; and identifying a first region associated with the image, by:

analyzing a plurality of pixels associated with the first image, and selecting a desired set of the plurality of pixels associated with the image to define the first region, wherein the first geometric construct uniquely identifies a portion of the first image, and wherein the desired set of the plurality of pixels associated with the first image define a predetermined minimum average radius.

8. The method of claim 7, further comprising:

capturing the first image using a camera or scanner; and segmenting the first image into a plurality of predefined components.

* * * * *